(12) United States Patent
Lee et al.

(10) Patent No.: US 10,612,501 B2
(45) Date of Patent: Apr. 7, 2020

(54) VEHICULAR RESONATOR

(71) Applicant: LS MTRON LTD., Anyang-si, Gyeonggi-do (KR)

(72) Inventors: Jung Uk Lee, Seoul (KR); Kang Wook Lee, Seoul (KR)

(73) Assignee: COOPER STANDARD AUTOMOTIVE AND INDUSTRIAL INC., Gumi-si, Gyeongsangbuk-Do (KR)

( * ) Notice: Subject to any disclaimer, the term of this patent is extended or adjusted under 35 U.S.C. 154(b) by 32 days.

(21) Appl. No.: 15/755,631

(22) PCT Filed: May 23, 2016

(86) PCT No.: PCT/KR2016/005433
§ 371 (c)(1),
(2) Date: Feb. 27, 2018

(87) PCT Pub. No.: WO2017/039119
PCT Pub. Date: Mar. 9, 2017

(65) Prior Publication Data
US 2018/0245553 A1  Aug. 30, 2018

(30) Foreign Application Priority Data
Sep. 1, 2015 (KR) .................. 10-2015-0123509

(51) Int. Cl.
*F02M 35/12* (2006.01)
*F02M 35/10* (2006.01)

(52) U.S. Cl.
CPC ........ *F02M 35/1255* (2013.01); *F02M 35/10* (2013.01); *F02M 35/10157* (2013.01);
(Continued)

(58) Field of Classification Search
CPC .. F02M 35/10; F02M 35/10157; F02M 35/12; F02M 35/1255; F02M 35/1261; F02M 35/1266; Y02T 10/144
See application file for complete search history.

(56) References Cited

U.S. PATENT DOCUMENTS

| | | | |
|---|---|---|---|
| 2012/0048645 A1* | 3/2012 | Bussow | F04B 39/0044 181/229 |
| 2012/0292128 A1 | 11/2012 | Keesser et al. | |
| 2015/0226163 A1 | 8/2015 | Hwang et al. | |

FOREIGN PATENT DOCUMENTS

| | | |
|---|---|---|
| KR | 1020060116275 A | 11/2006 |
| KR | 1020070104190 A | 10/2007 |

(Continued)

OTHER PUBLICATIONS

International Search Report for related International Application No. PCT/KR2016/005433; report dated Sep. 26, 2016; (4 pages).

(Continued)

*Primary Examiner* — Brandon D Lee
(74) *Attorney, Agent, or Firm* — K&L Gates LLP

(57) ABSTRACT

The present invention relates to a vehicular resonator comprising: an outer pipe that constitutes the exterior thereof; an inner pipe, a part of which is inserted into the outer pipe, and which has a slit formed therein as an air movement passage; a movable pipe configured to be able to move inside a resonation chamber formed between the outer pipe and the inner pipe; and an elastic body having one side thereof coupled to the inner pipe and the other side thereof coupled to the movable pipe, thereby providing the movable pipe with an elastic force such that the movable pipe can move.

9 Claims, 7 Drawing Sheets

(52) U.S. Cl.
CPC ........ *F02M 35/12* (2013.01); *F02M 35/1261* (2013.01); *F02M 35/1266* (2013.01); *Y02T 10/144* (2013.01)

(56) References Cited

FOREIGN PATENT DOCUMENTS

| KR | 102010008448 A | 1/2010 |
|----|----------------|--------|
| KR | 1020110048931 A | 5/2011 |
| KR | 1020150095437 A | 8/2015 |

OTHER PUBLICATIONS

Chinese Office Action for related Chinese Application No. 201680050665.0; action dated Sep. 30, 2019; (6 page).

* cited by examiner

VEHICULAR RESONATOR

CROSS-REFERENCE TO RELATED APPLICATIONS

The present application is a National Stage of International Application No. PCT/KR2016/005433, filed May 23, 2016, which claims priority to Korean Application No. 10-2015-0123509, filed Sep. 1, 2015, the disclosures of which are incorporated herein by reference.

TECHNICAL FIELD

The present disclosure relates to a vehicular resonator with a plurality of resonation chambers for reducing movement noise of air, and more particularly, to a vehicular resonator that can adjust the size of a space where air can move by covering or opening a part of slit which guides the movement of air to the resonation chambers based on the revolutions per minute (RPM) of a turbo-charger to reduce movement noise of compressed air transmitted from the turbo-charger.

BACKGROUND ART

In general, an air intake system for a vehicle includes an air cleaner, a turbo-charger, an inter-cooler, an air duct and an engine manifolder, and outdoor air introduced into an internal combustion engine by the air intake system repeats expansion and compression, causing pulsation. This pulsation effect causes noise due to the pressure changes of air, and it is especially the cause of greater noise by a resonation effect of air in the vehicle itself or interior space of the vehicle.

To suppress air intake noise, an air intake hose installed at the rear end of the turbo-charger has a resonator to tune the air intake system to a specific frequency.

The conventional resonator primarily includes a Helmholtz resonator that reduces noise in air by reducing the sound pressure of a specific frequency range in noise generating from the air intake system. That is, the Helmholtz resonator reduces noise in air introduced into the inside by tuning and resonating air intake noise of a specific frequency, in particular, a low frequency.

However, when a high load is applied to the engine of the vehicle or the vehicle speeds up, as exhaust gas discharged from the vehicle increases, the revolutions per minute (RPM) of the turbo-charger increases, and accordingly, an amount of air introduced into the turbo-charger and an air intake pipe line increases, and the temperature and pressure increases. This change of condition changes an area in which noise occurs, and at the same time, changes a noise reduction frequency range of a noise attenuator designed of a fixed type.

To solve this problem, Korean Patent Publication No. 2011-0048931 discloses an air intake noise attenuator wherein a resonation chamber for reducing air intake noise is divided into a plurality of parts, a plurality of slits communicating with the resonation chambers is provided, and air with a specific frequency is tuned for each resonation chamber. Because the air intake noise attenuator is configured such that tuning frequency of air is different for each resonation chamber, an advantage is that it can tune and resonate air with many frequencies.

However, air transmitted from the turbo-charger to the resonator is not limited to a preset specific frequency, and air with a continuous frequency is continuously transmitted. Accordingly, even though the air intake noise attenuator is applied to the internal combustion engine, it is only possible to tune a specific frequency in many bands, and it is impossible to tune an analogous type continuous frequency of air.

DISCLOSURE

Technical Problem

The present disclosure is developed to solve the limitation and problem of the conventional art such as the foregoing, and specifically, the present disclosure is directed to providing a vehicular resonator for properly tuning and resonating air with a continuous frequency transmitted from a turbo-charger to efficiently reduce air intake noise.

Technical Solution

To achieve the above-mentioned object, the present disclosure provides a vehicular resonator including an outer pipe that constitutes the exterior thereof, an inner pipe, a part of which is inserted into the outer pipe, and which has a slit formed therein as an air movement passage, a movable pipe configured to be able to move inside a resonation chamber formed between the outer pipe and the inner pipe, and an elastic body having one side thereof coupled to the inner pipe and the other side thereof coupled to the movable pipe, thereby providing the movable pipe with an elastic force such that the movable pipe can move.

Additionally, the inner pipe includes a partition wall which protrudes from an outer surface of the inner pipe toward the outer pipe and comes into contact with an inner surface of the outer pipe, and one side of the elastic body comes into contact with the partition wall of the inner pipe.

Additionally, the moveable pipe includes a connecting element of which one side comes into contact with an inner surface of the outer pipe and the other side comes into contact with an outer surface of the inner pipe, and which comes into contact with the elastic body, and a cover element which is integrally manufactured with the connecting element and configured to surround an outer surface of the inner pipe, and encloses a part of the slit.

Additionally, as the cover element moves, a space which covers the slit changes in size to tune a continuous frequency of air.

Additionally, a turbo-charger which operates based on preset reference revolutions per minute (RPM) is installed at a front end of the resonator to compress intake air supplied from an engine, and when the RPM of the turbo-charger increases compared to the reference RPM, the moveable pipe moves in a direction to compress the elastic body, and when the RPM of the turbo-charger reduces compared to the reference RPM, the moveable pipe moves in a direction to extend the elastic body.

Additionally, a movement area of air passing through the slit when the moveable pipe moves in the direction to compress the elastic body is larger than a movement area of air passing through the slit when the moveable pipe moves in the direction to extend the elastic body.

Additionally, an inner surface of the outer pipe has a stopper step with a predetermined step to limit the movement of the cover element.

Additionally, the moveable pipe includes an outer plate which comes into contact with an inner surface of the outer pipe, an inner plate which has a smaller diameter than the outer plate and comes into contact with an outer surface of the inner pipe, and at least one rib connecting the outer plate and the inner plate.

Additionally, a connecting plate is installed on one side of the outer plate, wherein the connecting plate comes into contact with the elastic body and has an end which comes into contact with the outer surface of the inner pipe.

Additionally, a turbo-charger which operates based on preset reference RPM is installed at a front end of the resonator to compress intake air supplied from an engine, and when the RPM of the turbo-charger increases compared to the reference RPM, the moveable pipe moves in a direction to compress the elastic body, and a movement area of air passing through the slit gradually reduces, and when the RPM of the turbo-charger reduces compared to the reference RPM, the moveable pipe moves in a direction to extend the elastic body, and a movement area of air passing through the slit gradually increases.

Advantageous Effects

According to the present disclosure proposed herein, there is an advantage that the size of a space where air can move can be adjusted by covering or opening a part of the slit through the movement of the moveable pipe within the resonation chamber based on the revolutions per minute (RPM) of the turbo-charger, thereby properly tuning and resonating air with a continuous frequency transmitted from the turbo-charger.

Additionally, there is an advantage that with the change in the range in which the slit is covered, the movement speed of air transmitted to the resonation chamber or an amount of air movement is adjusted, thereby properly tuning air intake noise.

BEST MODE

Figure 1:
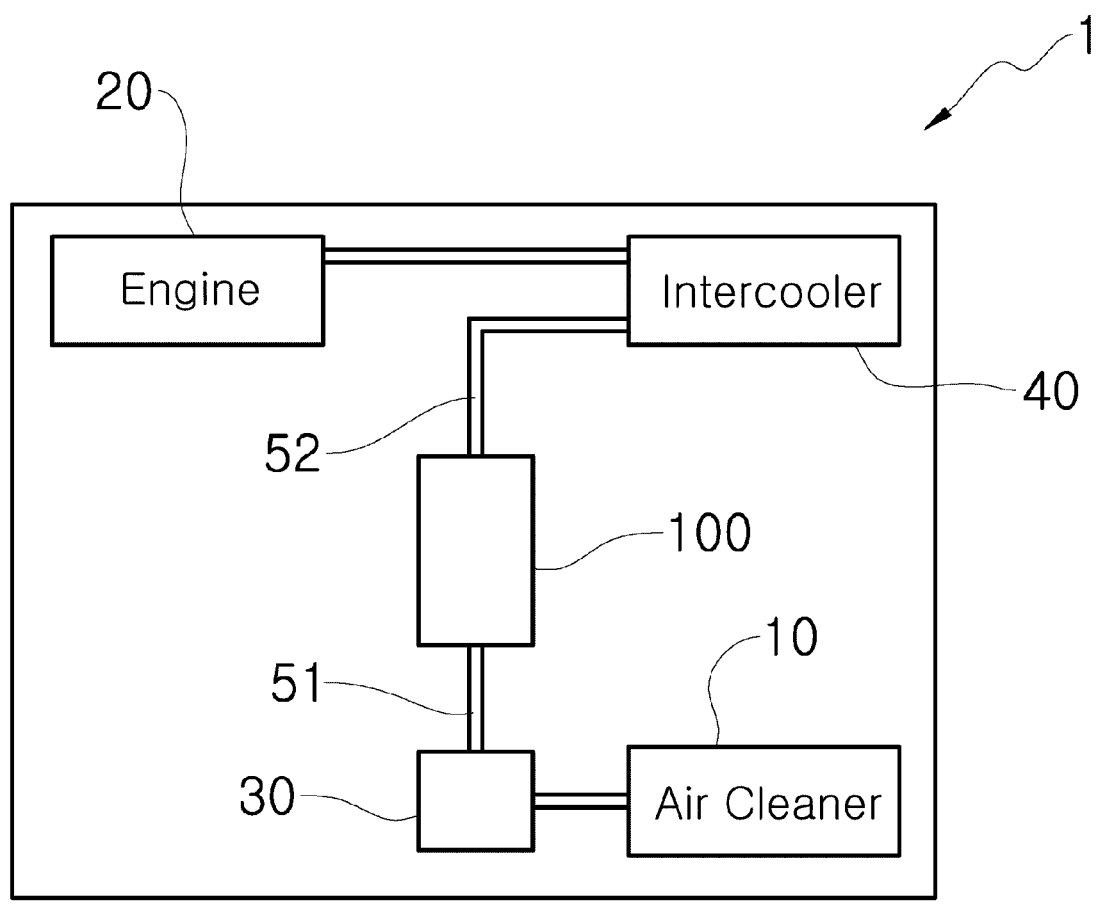
FIG. 1 is a schematic diagram of an air intake system for a vehicle.

Hereinafter, the preferred embodiments of the present disclosure are described with reference to the accompanying drawings. The present disclosure is described by referring to the embodiments shown in the drawings, but this is a description as an embodiment, and the technical spirit of the present disclosure and its key elements and operation are not limited thereby.

FIG. 1 is a schematic diagram of air intake system for a vehicle.

Referring to FIG. 1, the air intake system 1 for a vehicle has a turbo-charger 30 installed to supercharge intake air supplied to an engine. As the turbo-charger 30 generates air intake noise in the high frequency band during operation, a driver's ride quality reduces due to noise emitting from the turbo-charger 30 in operation, and the overall product performance of the vehicle reduces. Accordingly, a resonator 100 as a noise attenuator is installed together at the rear end of the turbo-charger 30 to reduce noise in operation.

Additionally, the air intake system 1 includes an engine 20 to supply power, an air cleaner 10 to filter out an impurity in intake air supplied from the engine 20, and an intercooler 40 to cool down the air supercharged by the turbo-charger 30 and supply it to the engine 20.

The resonator 100 is installed between connecting elements, such as hoses 51, 52, steel pipes or cast products, connected to the intercooler 40, to reduce noise of the turbo-charger 30 in operation, and reduces noise occurring upon air intake.

Hereinafter, the detailed configuration of the resonator 100 is described.

Figure 2:
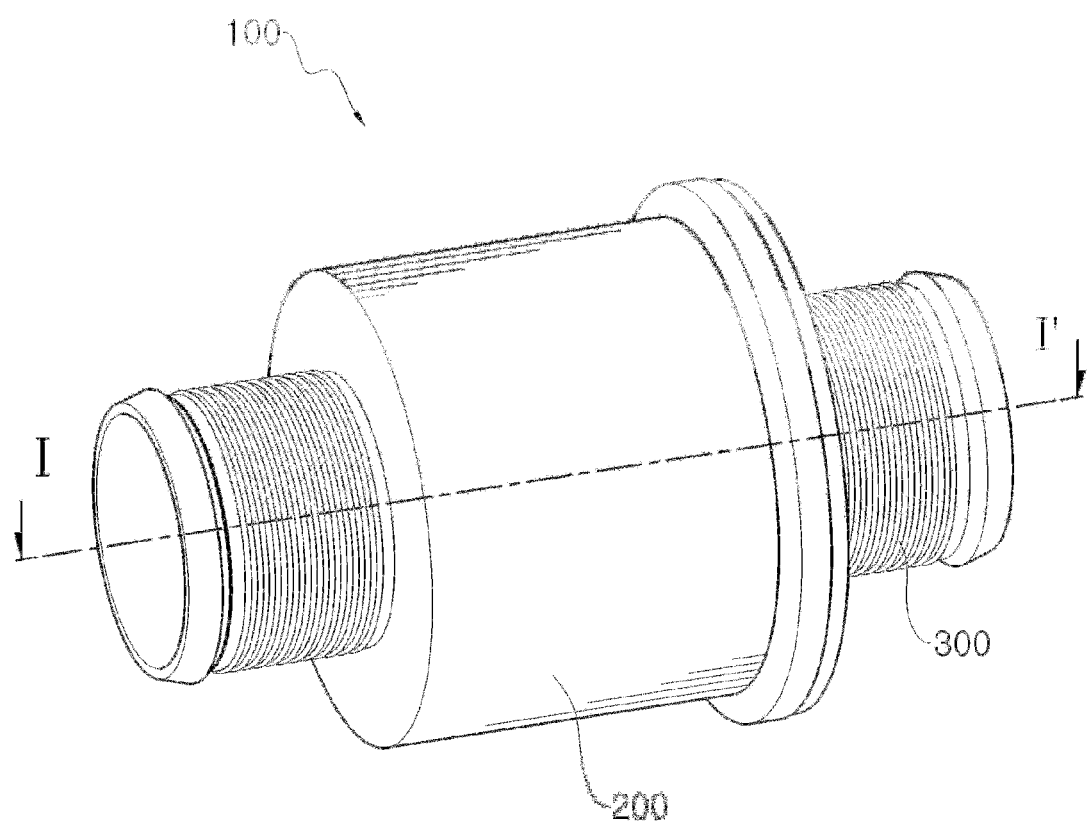
FIG. 2 is a perspective view showing the whole appearance of a vehicular resonator according to an embodiment of the present disclosure.
Figure 3:
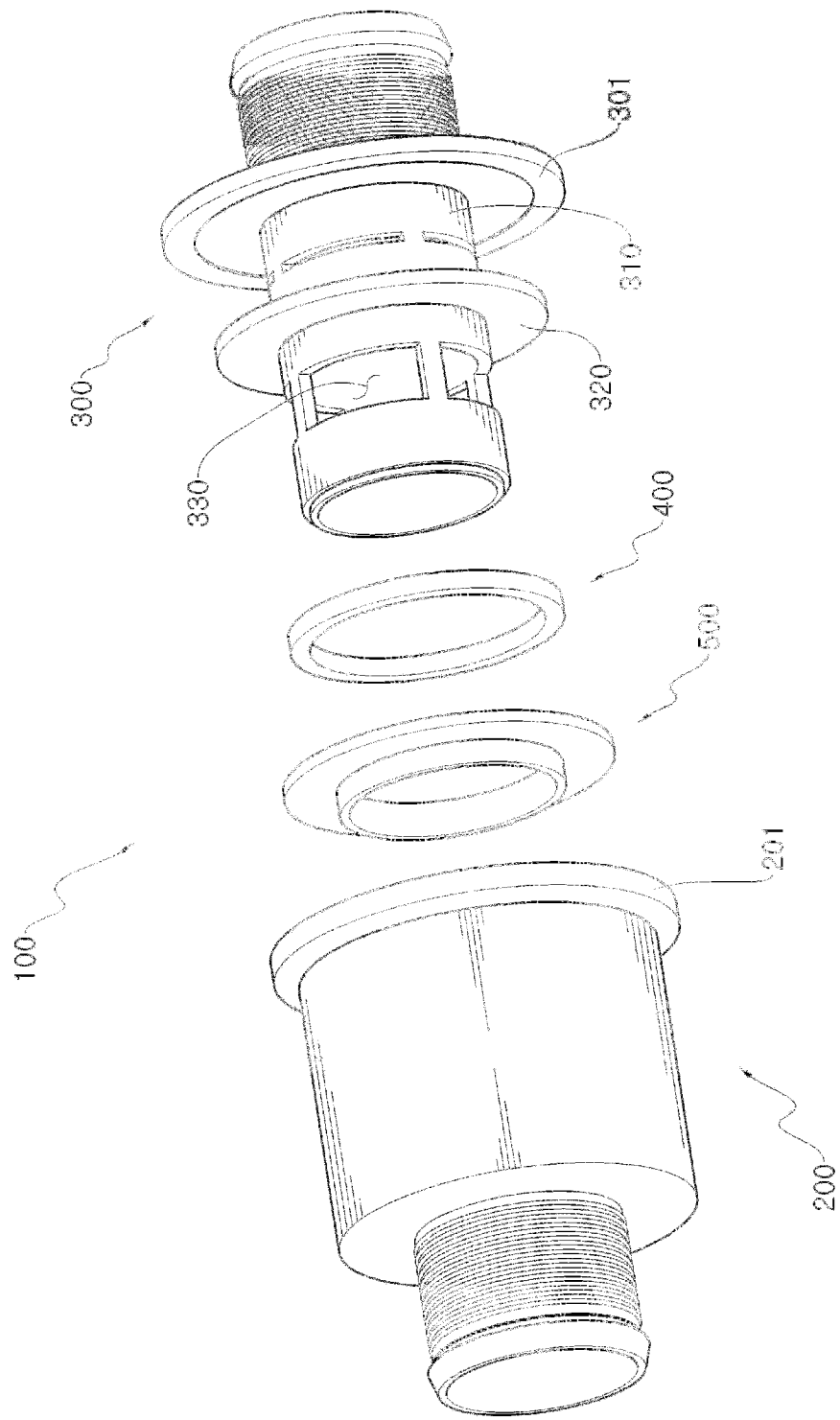
FIG. 3 is an exploded perspective view showing the internal configuration of the vehicular resonator of FIG. 2.

FIG. 2 is a perspective view showing the whole appearance of a vehicular resonator according to an embodiment of the present disclosure, and FIG. 3 is an exploded perspective view showing the internal configuration of the vehicular resonator.

Referring to FIGS. 2 and 3, the resonator 100 according to an embodiment of the present disclosure includes an outer pipe 200 that constitutes the exterior, and an inner pipe 300, a part of which is inserted into the outer pipe 200. An end of the outer pipe 200 has an outer coupling plate 201, and the inner pipe 300 has an inner coupling plate 301 configured to be coupled to the outer coupling plate 201. That is, the whole appearance of the resonator 100 may be manufactured by coupling, for example, welding type coupling, between the outer coupling plate 201 and the inner coupling plate 301.

The inner pipe 300 includes a body 310 in a cylindrical shape, and at least one partition wall 320 that encloses the outer surface of the body 310 and protrudes outward from the outer surface of the body 310. The partition wall 320 is spaced apart at a predetermined distance from the inner coupling plate 301 to divide a resonation chamber (see the reference numerals 510, 520 of FIG. 4) as a space for reducing air intake noise into a plurality of parts.

An elastic body 400 having a predetermined elastic force comes into contact with one side of the partition wall 320. Additionally, a moveable pipe 500 configured to move in left and right directions within the resonation chamber is attached to the other side of the elastic body 400. That is, one side of the elastic body 400 is fixed in contact with the partition wall 320, and the moveable pipe 500 is attached to the other side of the elastic body 400, and thus the moveable pipe 500 can move leftward and rightward with respect to the partition wall 320.

The internal configuration of the resonator 100 is described in more detail with reference to FIG. 4.

Figure 4:
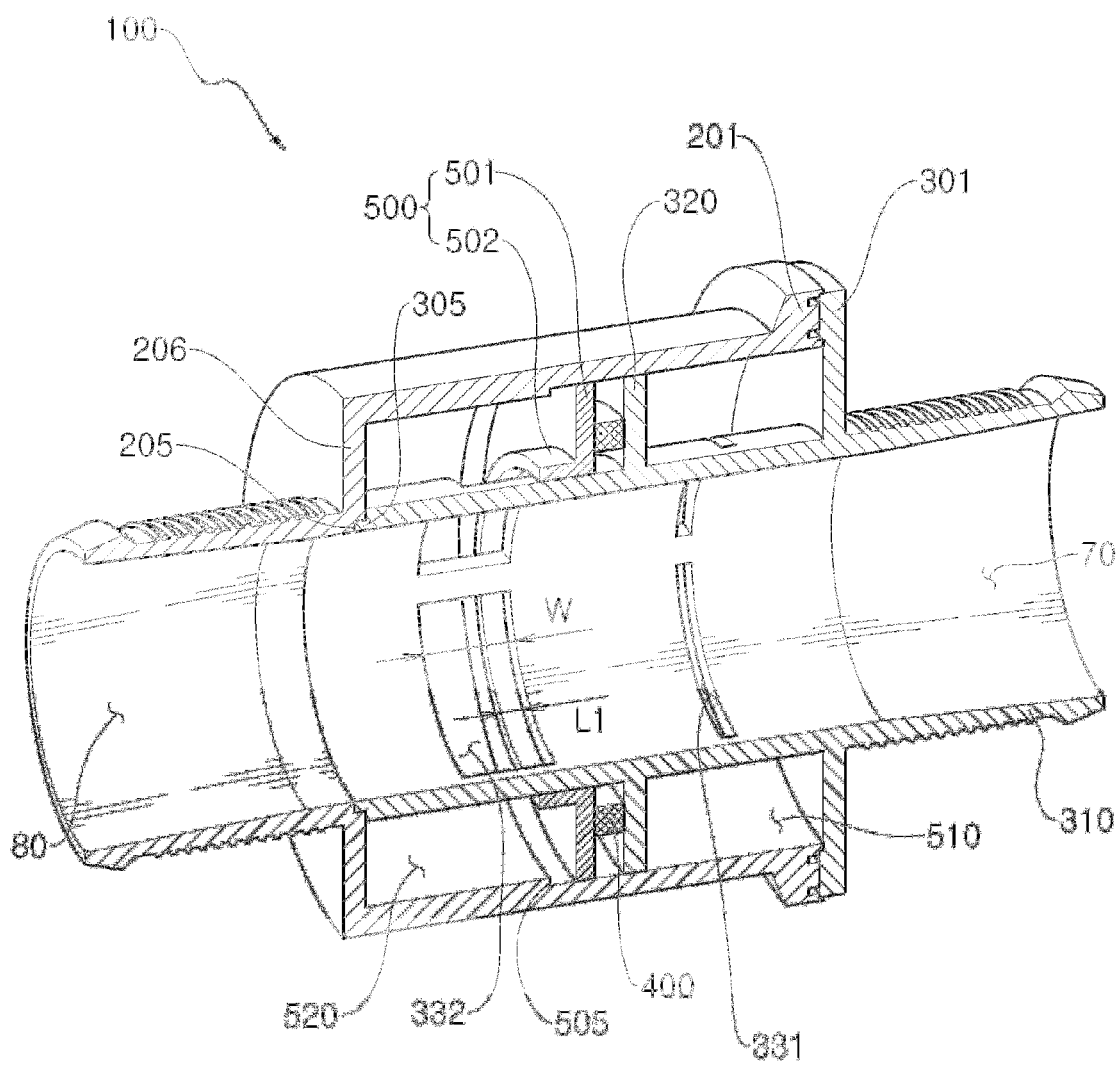
FIG. 4 is a cross-sectional view taken along the line I-I' of FIG. 2.

Referring to FIG. 4, the body 310 has a slit 330 to provide a movement passage of air. The slit 330 may communicate with resonation chambers 510, 520 for reducing movement noise of air. The slit includes a first slit 331 communicating with the first resonation chamber 510 and a second slit 332 communicating with the second resonation chamber 520 on the basis of a direction from an inlet 70 of air to an outlet 80 of air.

The first resonation chamber 510 is a space where all the parts except the first slit 331 are sealed by the outer coupling plate 301, a part of the outer pipe 200, the partition wall 320 and a part of the body 310 to reduce air intake noise. Likewise, the second resonation chamber 520 is a space where all the parts except the second slit 332 are sealed by a bent section 206 protruding and extending outward from one surface of the outer pipe 200, the other part of the outer pipe 200, the moveable pipe 500 and the other part of the body 310 to reduce air intake noise.

A part L1 of the width W of the second slit 332 may be covered by the moveable pipe 500. Additionally, as the moveable pipe 500 moves leftward and rightward, the frequency of air tuned in the second resonation chamber 520 communicating with the second slit 332 may change.

Specifically, the moveable pipe 500 includes a connecting element 501 that comes into contact with the elastic body 400, and a cover element 502 integrally manufactured with the connecting element 501 and enclosing the outer surface of the body 310. The connecting element 501 is installed such that its end comes into contact with the inner surface of the outer pipe 200 to hermetically seal the second resonation chamber 520. Additionally, the cover element 502 is shaped to enclose the outer surface of the body 310 to surround the part L1 of the width W the second slit. Accordingly, as the moveable pipe 500 moves, the width of the cover element 502 enclosing the second slit 332 also changes in size.

A stopper step 505 having a predetermined step is formed on the inner surface of the outer pipe 200 to limit the movement distance of the connecting element 501. That is, when the elastic body 400 extends, the movement distance of the connecting element 501 is limited by the stopper step 505. Accordingly, it can prevent the second slit 332 from being completely covered by the cover element 502.

Below is the process in which the inner pipe 300 is assembled into the outer pipe 200 and movement noise of air is reduced.

First, a user manufactures an inner assembly into which the inner pipe 300, the elastic body 400 and the moveable pipe 500 are integrally assembled. Subsequently, to insert the inner assembly into the outer pipe 200, the inner assembly is moved from the inlet 70 toward the outlet 80 in a state that the connecting element 501 of the moveable pipe and the partition wall 320 are brought into contact with the inner surface of the outer pipe 200.

When the movement of the inner assembly is completed and a protrusion 305 of the inner pipe 300 is close fitted to a recess 205 of the outer pipe 200, primary coupling of the outer pipe 200 and the inner pipe 300 is accomplished. Subsequently, the outer coupling plate 201 of the outer pipe 200 and the inner coupling plate 301 of the inner pipe 300 are completely coupled by a method such as welding, and thus complete coupling of the outer pipe 200 and the inner pipe 300 is accomplished.

The resonator 100 assembled according to this process can tune air with a continuous frequency compressed by the turbo-charger 30. Specifically, a part of air introduced into the body 310 from the inlet 70 moves to the first resonation chamber 510 and the second resonation chamber 520 through the first slit 331 and the second slit 332, respectively, and is subjected to tuning of air.

The turbo-charger 30 is installed at the front end of the resonator 100, and operates based on preset reference revolutions per minute (RPM) to compress intake air supplied from the engine. However, as the RPM of the turbo-charger 30 changes, the moveable pipe 500 moves, and the size L1 of the space occupied by the cover element 502 in the width W of the second slit 332 changes.

Specifically, when the RPM of the turbo-charger 30 increases compared to the reference RPM, the pressure and temperature of air introduced into the inner pipe 300 increases, and accordingly, the moveable pipe 500 moves rightward on the basis of FIG. 4, i.e., in a direction to compress the elastic body 400. Accordingly, the size of the space W-L1 where air can move to the second resonation chamber 520 gradually increases. That is to say, the part L1 that covers the second slit 332 by the cover element 502 gradually reduces. As described above, as the width W-L1 of an open space in the second slit 332 gradually changes, the second resonation chamber 520 allows for continuous frequency tuning of air.

On the contrary, when the RPM of the turbo-charger 30 reduces compared to the reference RPM, the moveable pipe 500 moves in a direction to extend the elastic body 400. Accordingly, in the width W of the second slit through which air can move to the second resonation chamber 520, the size W-L1 of the air moveable space gradually reduces. As described above, as the width W-L1 of an open space in the second slit 332 gradually changes, the second resonation chamber 520 allows for continuous frequency tuning of air.

The direction of continuous frequency tuning of air is determined by the properties of noise occurring depending on the RPM of the turbo-charger 30. For example, according to the embodiment shown in FIGS. 2 to 4, as the RPM of the turbo-charger 30 increases, the second resonation chamber 520 can continuously tune air with high frequencies to low frequencies.

Figure 5:
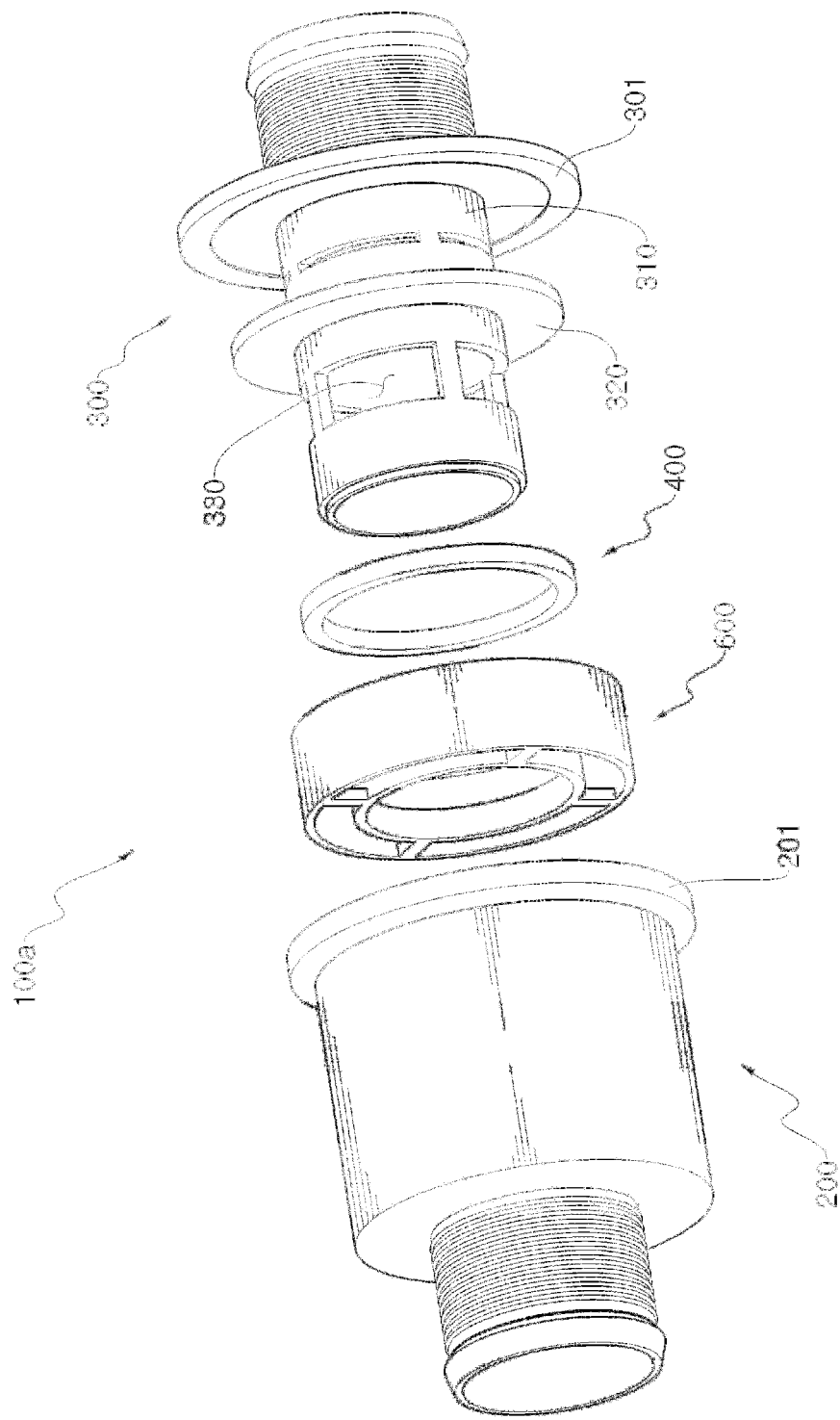
FIG. 5 is an exploded perspective view showing the internal configuration of a vehicular resonator according to another embodiment of the present disclosure.
Figure 6:
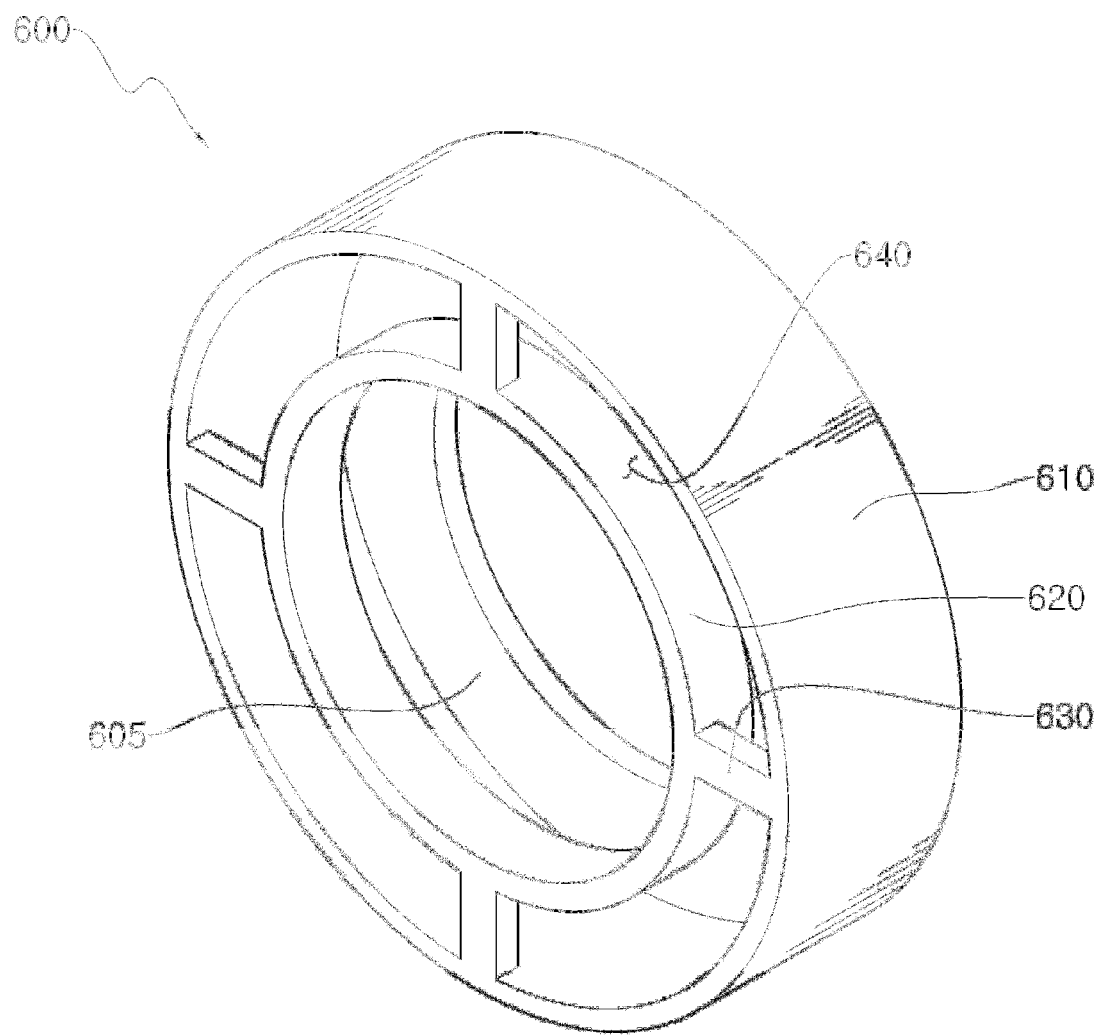
FIG. 6 is a perspective view showing the structure of a moveable pipe in the vehicular resonator of FIG. 5.
Figure 7:
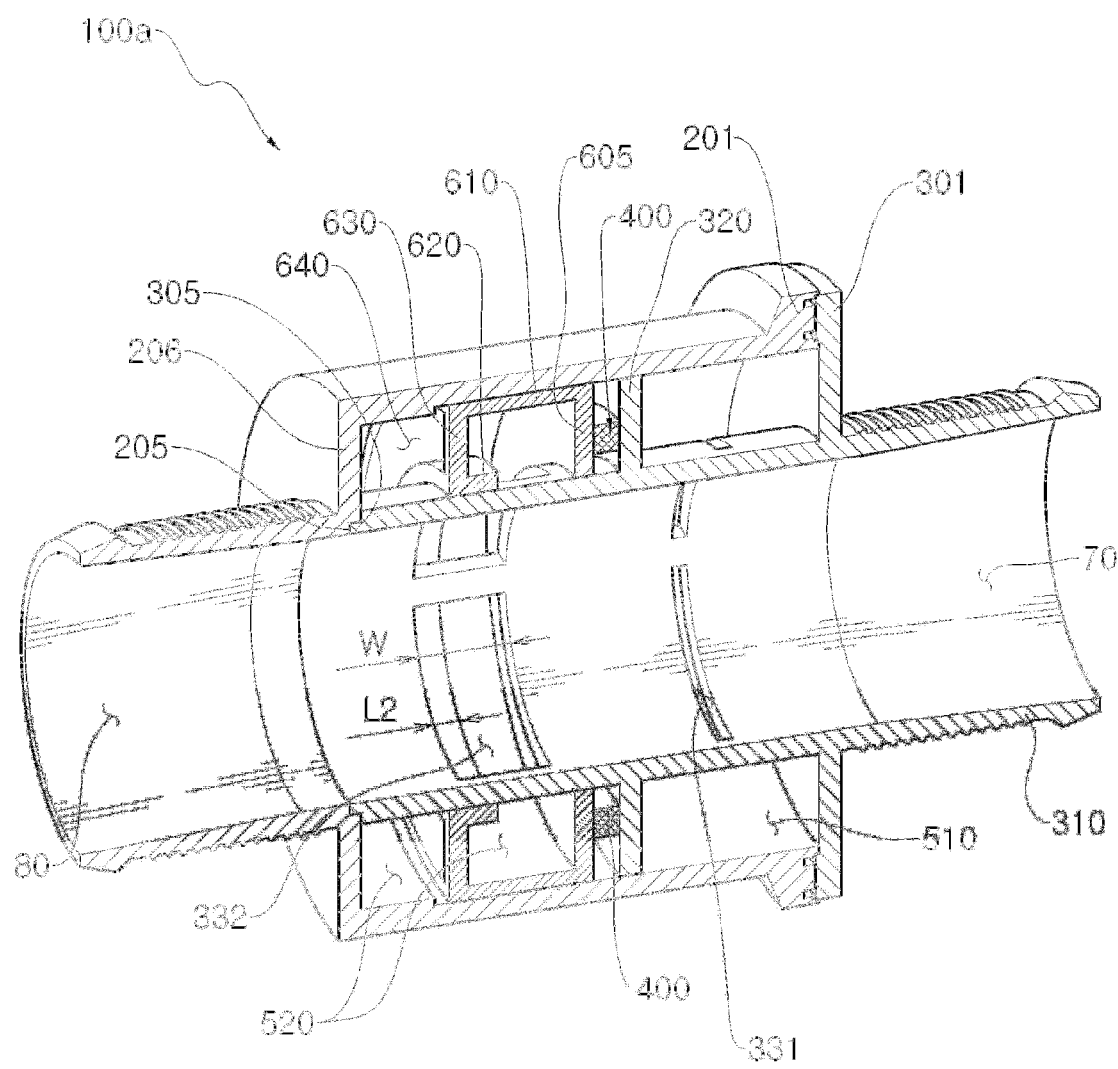
FIG. 7 is a cross-sectional view showing the internal configuration of the vehicular resonator of FIG. 5.

FIGS. 5 to 7 show a vehicular resonator according to another embodiment of the present disclosure. Specifically, FIG. 5 is an exploded perspective view showing the internal configuration of the vehicular resonator according to another embodiment of the present disclosure, FIG. 6 is a perspective view showing the structure of the moveable pipe in the vehicular resonator, and FIG. 7 is a cross-sectional view showing the internal configuration of the vehicular resonator of FIG. 5.

The vehicular resonator according to this embodiment is the same as the resonator according to the previous embodiment, only different in the shape of the moveable pipe, and thus, common elements are indicated using the same reference symbols as the previous embodiment, and a detailed description thereof is omitted herein.

First, referring to FIGS. 5 and 6, the vehicular resonator 100a according to this embodiment includes the outer pipe 200, the inner pipe 300, the elastic body 400 and a moveable pipe 600. The moveable pipe 600 includes an outer plate 610 that comes into contact with the inner surface of the outer pipe 200 and has a predetermined width, and an inner plate 620 that has a smaller diameter than the outer plate 610 and comes into contact with the outer surface of the body 310. One side of the outer plate 610 has a connecting plate 605 that extends in upward and downward directions with an end in contact with the outer surface of the body 310 and a side surface to which the elastic body 400 is coupled.

The outer plate 610 and the inner plate 620 are coupled to each other by a plurality of ribs 630. Specifically, one side of the rib 630 is coupled to the outer plate 610, and the other side of the rib 630 is coupled to the inner plate 620. A through hole 640 or a movement space of air is formed in a space between any one of the plurality of ribs 630 and other adjacent rib. The number of ribs 630 corresponds to the number of through holes 640.

The structure of the resonator 100a and a process of reducing movement noise of air according to this embodiment are described with reference to FIG. 7 as below.

The inner plate 620 is installed to enclose a part of the width W of the second slit. Accordingly, when the width W of the second slit is fixed, as the inner plate 620 moves leftward and rightward, the size W-L2 of a movement space of air in the second slit 332 may change.

Specifically, when the RPM of the turbo-charger 30 increases compared to the reference RPM, the pressure and temperature of air introduced into the inner pipe 300 increases, and accordingly, the moveable pipe 600 moves rightward on the basis of FIG. 7, i.e., in a direction to compress the elastic body 400. Accordingly, the width L2 of a part where the second slit 332 is covered by the inner plate 620 increases, and the size of the space W-L2 where air can move to the second resonation chamber 520 reduces. As described above, as the air moveable space W-L2 in the width W of the second slit 332 gradually changes, the second resonation chamber 520 allows for continuous frequency tuning of air.

On the contrary, when the RPM of the turbo-charger 30 reduces compared to the reference RPM, the inner plate 620 moves in a direction to extend the elastic body 400. Accordingly, the space W-L2 where air can move to the second resonation chamber 520 increases. As described above, as the air moveable space W-L2 in the width W of the second slit 332 gradually changes, the second resonation chamber 520 allows for continuous frequency tuning of air.

The direction of continuous frequency tuning of air is determined by the properties of noise occurring depending on the RPM of the turbo-charger 30. For example, according to the embodiment shown in FIGS. 5 to 7, as the RPM of the turbo-charger 30 increases, the second resonation chamber 520 can continuously tune air with low frequencies to high frequencies.

As described above, according to the present disclosure, there is an advantage that the size of the space where air can move can be adjusted by covering a part of the slit through the movement of the moveable pipe within the resonation chamber based on the RPM of the turbo-charger, thereby properly tuning and resonating air with a continuous frequency transmitted from the turbo-charger.

The foregoing description is provided to describe the technical spirit of the present disclosure for the purpose of illustration only, and various modifications and variations may be made thereto by those having ordinary skill in the technical field pertaining to the present disclosure without departing from the nature of the present disclosure. Accordingly, the embodiments disclosed herein are provided to describe the technical spirit of the present disclosure, but not intended to be limiting, and the scope of the technical spirit of the present disclosure is not limited by these embodiments. The scope of protection of the present disclosure should be interpreted by the appended claims, and the overall technical spirit within the equivalent scope thereto shall be construed as falling within the scope of protection of the present disclosure.

The invention claimed is:

1. A vehicular resonator comprising:
   an outer pipe that constitutes the exterior thereof;
   an inner pipe, a part of which is inserted into the outer pipe, and wherein the inner pipe has a slit formed therein as an air movement passage;
   a movable pipe configured to move in two opposite directions on the inner pipe within a resonation chamber formed between the outer pipe and the inner pipe; and
   an elastic body coupled between the inner pipe and the movable pipe, providing the movable pipe with an elastic force such that the movable pipe can move,
   wherein the inner pipe includes a partition wall which protrudes from an outer surface of the inner pipe toward the outer pipe and comes into contact with an inner surface of the outer pipe, and
   wherein one side of the elastic body comes into contact with the partition wall of the inner pipe.

2. A vehicular resonator comprising:
   an outer pipe that constitutes the exterior thereof;
   an inner pipe, a part of which is inserted into the outer pipe, and wherein the inner pipe has a slit formed therein as an air movement passage;
   a movable pipe configured to move in two opposite directions on the inner pipe within a resonation chamber formed between the outer pipe and the inner pipe; and
   an elastic body coupled between the inner pipe and the movable pipe, providing the movable pipe with an elastic force such that the movable pipe can move,
   wherein the movable pipe comprises:
      a connecting element of which one side comes into contact with an inner surface of the outer pipe and the other side comes into contact with an outer surface of the inner pipe, and which comes into contact with the elastic body; and
      a cover element which is integrally manufactured with the connecting element and configured to surround the outer surface of the inner pipe, and encloses a part of the slit.

3. The vehicular resonator according to claim 2, wherein as the cover element moves, a space which covers the slit changes in size to tune a continuous frequency of air.

4. The vehicular resonator according to claim 2, wherein a turbo-charger which operates based on preset reference revolutions per minute (RPM) is installed at a front end of the resonator to compress intake air supplied from an engine,
   wherein when the RPM of the turbo-charger increases compared to the reference RPM, the movable pipe moves in a direction to compress the elastic body, and
   wherein when the RPM of the turbo-charger reduces compared to the reference RPM, the movable pipe moves in a direction to extend the elastic body.

5. The vehicular resonator according to claim 4, wherein a movement area of air passing through the slit when the movable pipe moves in the direction to compress the elastic body is larger than a movement area of air passing through the slit when the movable pipe moves in the direction to extend the elastic body.

6. The vehicular resonator according to claim 2, wherein the inner surface of the outer pipe has a stopper step with a predetermined step to limit a movement of the cover element.

7. A vehicular resonator comprising:
   an outer pipe that constitutes the exterior thereof;
   an inner pipe, a part of which is inserted into the outer pipe, and wherein the inner pipe has a slit formed therein as an air movement passage;
   a movable pipe configured to move in two opposite directions on the inner pipe within a resonation chamber formed between the outer pipe and the inner pipe; and
   an elastic body coupled between the inner pipe and the movable pipe, providing the movable pipe with an elastic force such that the movable pipe can move,
   wherein the movable pipe comprises:
      an outer plate which comes into contact with an inner surface of the outer pipe;
      an inner plate which has a smaller diameter than the outer plate and comes into contact with an outer surface of the inner pipe; and at least one rib connecting the outer plate and the inner plate.

8. The vehicular resonator according to claim 7, wherein a connecting plate is installed on one side of the outer plate, wherein the connecting plate comes into contact with the elastic body and has an end which comes into contact with the outer surface of the inner pipe.

9. The vehicular resonator according to claim 7, wherein a turbo-charger which operates based on preset reference revolutions per minute (RPM) is installed at a front end of the resonator to compress intake air supplied from an engine,
   wherein when the RPM of the turbo-charger increases compared to the reference RPM, the movable pipe moves in a direction to compress the elastic body, and a movement area of air passing through the slit gradually reduces, and
   wherein when the RPM of the turbo-charger reduces compared to the reference RPM, the movable pipe moves in a direction to extend the elastic body, and a movement area of air passing through the slit gradually increases.

* * * * *